US006574538B2

(12) United States Patent
Sasaki

(10) Patent No.: US 6,574,538 B2
(45) Date of Patent: Jun. 3, 2003

(54) OPERATIONAL CONDITION RECORDING APPARATUS AND OPERATING CONTROL SYSTEM UTILIZING IT

(75) Inventor: Kazuyuki Sasaki, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/911,712

(22) Filed: Jul. 25, 2001

(65) Prior Publication Data

US 2002/0035422 A1 Mar. 21, 2002

(30) Foreign Application Priority Data

Jul. 26, 2000 (JP) ....................................... 2000-225403

(51) Int. Cl.[7] .................................................. G06F 7/00
(52) U.S. Cl. ............................. 701/35; 701/29; 701/71; 701/80
(58) Field of Search ............................. 701/31, 29, 36, 701/117, 35, 70, 71, 74, 80; 340/438, 439, 937, 905, 426, 539, 541; 369/21

(56) References Cited

U.S. PATENT DOCUMENTS 5,305,219 A * 4/1994 Ishibashi et al. ............ 340/995
5,581,464 A * 12/1996 Woll et al. .................. 180/287
5,638,273 A * 6/1997 Coiner et al. .................. 360/5
5,784,005 A * 7/1998 Akutsu et al. .............. 340/905
5,815,093 A * 9/1998 Kikinis ........................ 340/426
RE35,920 E * 10/1998 Sorden et al. ......... 342/357.07
6,012,012 A * 1/2000 Fleck et al. ................. 340/905
6,076,026 A * 6/2000 Jambhekar et al. ......... 340/426
6,185,490 B1 * 2/2001 Ferguson ..................... 369/21
6,246,933 B1 * 6/2001 Bague ........................ 340/438
6,298,290 B1 * 10/2001 Abe et al. .................... 340/937
6,389,340 B1 * 5/2002 Rayner ....................... 340/438

FOREIGN PATENT DOCUMENTS

GB 2271180 A * 4/1994

* cited by examiner

*Primary Examiner*—Jacques H. Louis-Jacques
(74) *Attorney, Agent, or Firm*—Sughrue Mion, PLLC

(57) ABSTRACT

An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus includes: a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met.

58 Claims, 2 Drawing Sheets

OPERATIONAL CONDITION RECORDING APPARATUS AND OPERATING CONTROL SYSTEM UTILIZING IT

BACKGROUND OF THE INVENTION

1. Field of the Invention

The present invention relates to an operational condition recording apparatus that records the operational condition of a vehicle such as a truck, a bus, a taxi and a private car and an operating control system utilizing it.

2. Related Art

Heretofore, for this type of operational condition recording apparatus, a tachograph mounted in a large truck and a bus is known. This tachograph always continues to record the running speed of a vehicle while the vehicle is driven so that the record is utilized for the operating control of the vehicle.

However, in the above-mentioned related tachograph, in case a traffic accident occurs in relation to a vehicle, a detailed operational condition immediately before the accident occurs cannot be recorded as a flight recorder of an aircraft records it though the running speed when the accident occurs can be known.

In the meantime, as described above, the transportation industry and others have a need to control the operation of a vehicle for a tachograph.

Further, in a recent vehicle, electronization is accelerated, many sensors for detecting a condition of the vehicle are mounted even if the vehicle is not a special one and information related to the operational condition such as the behavior of the vehicle can be acquired easily without costs.

SUMMARY OF THE INVENTION

The invention is made in view of such a background and the object is to provide an operational condition recording apparatus acquired by improving a related tachograph and an operating control system utilizing it which enable recording the behavior of a vehicle in detail when an accident occurs so that a situation in which the accident occurs can be re-created in detail, analyzing the cause of the accident based upon such re-created data and contributing to the prevention of the reoccurrence of an accident.

To achieve the object, according to a first aspect of the invention, there is provided an operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met.

The operational condition recording apparatus according to the first aspect records information related to a vehicular operational condition in the first mode as the recording mode during normal traveling. Concretely, as a well-known digital tachograph, data such as the running speed, the traveling time, the stopping time and the traveling distance of a vehicle is recorded. When a driver operates a switch arranged near to a driver's seat, a function can be also expanded so that a vehicular condition such as traveling with a passenger or cargo/traveling without a passenger or cargo, loading/unloading, standby/break/lodging and refueling/a check can be recorded and the data is useful for data for vehicular operating control. That is, in the first mode, the similar object and effect to that of a related operational condition recording apparatus can be achieved.

The operational condition recording apparatus according to the first aspect is also provided with the second mode as the recording mode. The object of the second mode is mainly to record a situation before and after an accident in case a vehicle has risk of causing a traffic accident or in case a vehicle actually causes a traffic accident and more detailed operational condition information is recorded compared with the first recording mode. That is, a situation when the accident occurs is recorded by automatically switching a recording mode from the first recording mode to the second recording mode when a predetermined determination condition is met and recording more detailed data than data in the first recording mode, and is used to re-create the accident situation.

In the second mode, information except operational condition information given in the first aspect as an example may be also additionally recorded. For example, as a voice recorder of an aircraft, sound or voice inside and/or outside a vehicle may be also converted to digital data and recorded. In case a peripheral monitoring system including a front/front side monitoring camera and a rear/rear side monitoring camera is mounted in a vehicle, an image captured by it is compressed and may be also recorded as digital data.

For the predetermined determination condition, various types of conditions can be set and are described in detail in the succeeding aspects, however, to give concrete examples which are not described in the aspects, when a scream such as "watch out!" and "wow" of a driver is detected by a microphone mounted inside a vehicle, a recording mode may be also automatically switched to the second recording mode or when the sound of a slip of wheels or impulsive sound caused in a collision accident of another vehicle is detected by a microphone mounted outside the vehicle, a recording mode maybe also switched to the second mode. Further, when a driver operates a predetermined switch, a predetermined condition is manually met and the recording mode may be also switched to the second recording mode. Hereby, by turning a switch on when passing is started on a highway and turning the switch off after the passing is finished, operational condition information such as accelerating performance and distance between the corresponding vehicle and a front vehicle or the succeeding vehicle respectively during passing can be recorded, therefore, material to review whether safe passing driving is performed or not can be provided by reviewing the data after a driver stops driving.

The operational condition recording apparatus according to the first aspect can record the condition of a vehicle in detail before and after an accident occurs, having the similar function to that of a related tachograph. Therefore, after the accident occurs, a situation when the accident occurs can be re-created in detail, the cause of the accident can be analyzed based upon such re-created data and an accident can be prevented from recurring.

An operational condition recording apparatus according to a second aspect is based upon the operational condition recording apparatus according to the first aspect and is characterized in that in the second mode, the above-mentioned vehicular operational condition information is recorded at a shorter sampling interval, compared with that in the first mode.

In the operational condition recording apparatus according to the second aspect, in the second mode, recording higher in recording density is enabled, compared with that in the first mode. As described above, the object of the first recording mode is to fulfill the similar function to that of a related tachograph and in view of such an object, operational condition information may be recorded at a relatively long sampling period such as once per 0.5 second. However, as the object of the second mode is to record a situation before and after an accident occurs in case a vehicle has risk of causing a traffic accident or in case a vehicle actually causes the traffic accident, the recording of more detailed data is required to analyze the situation of the vehicle before and after the accident.

According to the operational condition recording apparatus according to the second aspect, since the operational condition information of a vehicle is recorded at a short sampling interval when a recording mode is switched to the second mode, information the density of which is high can be recorded, the condition of the vehicle before and after an accident occurs can be recorded in detail and a situation of the accident after the accident occurs can be re-created in detail. Since operational condition information can be recorded at a sampling period required and enough for an operational condition recording apparatus in the first mode, a recorder having large memory capacity is not required.

An operational condition recording apparatus according to a third aspect is based upon the operational condition recording apparatus according to the first or second aspect and is characterized in that in the second mode, vehicular operational condition information of a type which is not recorded in the first mode is recorded.

In the operational condition recording apparatus according to the third aspect, in the second mode, vehicular operational condition information of a type which is not recorded in the first recording mode is also recorded. For example, if its situation is to be re-created in case a collision accident occurs, only the record of the running speed of own vehicle is not sufficient even if recording density is enhanced. However, if the change of distance between own vehicle and a front traveling vehicle is recorded in detail, the change of the running speed of the front traveling vehicle can be re-created based upon relation to the running speed of own vehicle and it can be discriminated whether own vehicle collides because a driver of the front vehicle suddenly treads a brake pedal or a driver of own vehicle collides without treading a brake pedal because of driving looking aside and dozing at the wheel though the front vehicle temporarily stops, for example. Similarly, in case the following vehicle collides with own vehicle, a situation such as the following vehicle collides, cause of the collision such as the fault of the driver of the following vehicle though own vehicle slowly reduces speed, the sudden tread of a brake pedal of own vehicle induces the collision of the following vehicle, and the following vehicle secures sufficient distance between them can be also re-created in detail if the change of distance between own vehicle and the succeeding vehicle is recorded in detail. From such a viewpoint, it is desirable that in the second mode, various information described at the beginning of the first aspect is additionally recorded.

According to the operational condition recording apparatus according to the third aspect, as vehicular operational condition information of a type which is not recorded in the first mode is also recorded in the second mode, not only the condition of own vehicle before and after an accident occurs but also relation to another vehicle traveling around own vehicle and the structure of a road can be recorded in detail and the situation of the accident can be further re-created in detail.

In the description of the first to third aspects, the occurrence of a traffic accident is mainly described, however, in case a vehicle skids or spins though no accident occurs, the occurrence of such a dangerous state can be also recorded and re-created.

An operational condition recording apparatus according to a fourth aspect is based upon the operational condition recording apparatus according to any of the first to third aspects and is characterized in that a recording mode is changed from the second mode to the first mode when a situation changes from a state in which the above-mentioned predetermined determination condition is met to a state of failure.

In the operational condition recording apparatus according to the fourth aspect, operation after switching to the second mode is determined. For example as clear if aspects described later are referred, in an embodiment that when distance between own vehicle and a front vehicle becomes short during traveling at faster speed (for example, 80 km/h) than predetermined speed, a predetermined determination condition is met, a recording mode may be switched to the first mode afterward if the driver can avoid a collision accident. Rather, if a recording mode remains the second mode, the capacity of the recorder is wasted because the amount of information to be recorded is much. Then, when a predetermined determination condition is not met, a recording mode is switched from the second mode to the first mode. After a recording mode is switched to the first mode, the operational condition recording apparatus has the similar function to that of a normal tachograph some examples of the application of data recorded in the second recording mode are conceivable. A first method is to regard the data in the second mode as unnecessary and delete it when a recording mode is switched to the first recording mode, a second method is to store the data recorded in the second mode in the recorder as reference data for preventing the occurrence of the similar risk beforehand, and a third method to send the data recorded in the second mode to a control center and deleting the data from the recorder in an operating control system described in a thirty-first aspect. The first method is advantageous in case the capacity of the recorder is small. The second method can be adopted in case the recorder has sufficient capacity and has an advantage that the integrated operating control of a vehicle can be easily executed because a detailed record in the second mode is continuously put in a record history as a tachograph. As in the third method, a large quantity of information recorded in the second mode is sent to a control center and can be deleted from the recorder of a vehicle though only an operating control system provided with the control center can adopt the method, the method has an advantage that the method can be applied in case the capacity of the recorder mounted in the vehicle is small, effectively utilizing information in the second mode.

According to the operational condition recording apparatus according to the fourth aspect, as a recording mode is restored from the second mode to the first mode when a situation changes from a state in which a predetermined determination condition is met to a state of failure, the operation is restored to the similar operation to that of a normal tachograph after a vehicle escapes from a critical condition for example, the drive recorder is released from a large quantity of information record required in the second mode, the resources of the recorder are never consumed in vain and the memory capacity required by the recorder can be reduced possibly.

According to a fifth aspect of the invention, there is provided an operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started.

The operational condition recording apparatus according to the fifth aspect is different from the operational condition recording apparatus according to the first to fourth aspects configured in that function as a normal tachograph is omitted, it has no functions as a general tachograph and when a predetermined determination condition is met, the recording of operational condition information equivalent to that in the second recording mode in the first aspect is started. The object of the operational condition recording apparatus is to record the operational condition information of a vehicle to utilize a lesson of being frightened and record as learning data to prevent the occurrence of a future accident beforehand only when the vehicle meets with a critical situation in case the total operational history of the vehicle is not required.

Though the operational condition recording apparatus according to the fifth aspect is not suitable for the management of the whole operational history of a vehicle such as a truck and a taxi, a lesson of being frightened is effectively utilized by recording the operational condition information of a vehicle when the vehicle meets with a critical situation in a field in which a tachograph is originally not mounted such as a private car owned by an individual, learning data to prevent the occurrence of a future accident beforehand can be provided and particularly, a hint for safe driving can be given to a newly-licensed driver and a driver only driving on the weekend. This operational condition recording apparatus can be applied to not only a private car but a training car of a driving school and after training on a road is finished, concrete data is presented to a student to be material for learning safe driving. For the training vehicle of the driving school, if the predetermined determination condition is met when an instructor puts his foot on a brake pedal on the side of a spare seat on which the instructor is seated or the instructor operates a predetermined switch, the configuration of the operational condition recording apparatus can be facilitated.

An operational condition recording apparatus according to a sixth aspect is based upon the operational condition recording apparatus according to the fifth aspect and is characterized in that when a situation changes from a state in which the predetermined determination condition is met to a state of failure, the recording operation of the operational condition information is stopped.

In the operational condition recording apparatus according to the sixth aspect, a condition for stopping recording after the recording of operational condition information is started is determined. As known if aspects described later are referred for example, in an embodiment in which a predetermined determination condition is met when distance between the corresponding vehicle and a front vehicle is reduced while the vehicle travels at speed (for example, 80 km/h) exceeding predetermined speed, if a driver suitably acts and can avoid a collision accident, the recording of operational condition information may be stopped afterward. Rather, if the recording is continued, the recording of a large quantity of information is required and the capacity of the recorder is wasted. Then, when a predetermined determination condition is not met, recording operation is stopped. As the main object of the operational condition recording apparatuses according to the five and sixth aspects is to provide the material of a lesson for safe driving, the deletion of record data in the description of the fourth aspect is not supposed and recorded information is stored until it is transferred to a personal computer after return for example.

According to the operational condition recording apparatus according to the sixth aspect, since recording operation is stopped when a situation changes from a state in which a predetermined determination condition is met to a state of failure, only a situation before and after a vehicle is in a critical condition can be recorded in the recorder. Therefore, the required memory capacity of the recorder can be reduced possibly. From the object to provide the material of a lesson for safe driving, unnecessary information is not recorded differently from a general tachograph and as only information useful for preventing a future traffic accident is recorded, the operational condition recording apparatus is convenient for the object.

In the operational condition recording apparatuses according to the first to sixth aspects, various elements can be adopted as a predetermined determination condition as described above. However, as various sensors are mounted in a recent automobile, the sensors are convenient if they are effectively utilized and can be useful to judge whether a predetermined determination condition is met or not.

An operational condition recording apparatus according to a seventh aspect is based upon the operational condition recording apparatus according to any of the first to sixth aspects and is characterized in that the predetermined determination condition is met when a risk detector determines that a vehicle is in a critical situation.

The operational condition recording apparatus according to the seventh aspect is provided with a risk detector for determining whether a vehicle is in a critical situation or not and when it is determined by that the vehicle is in a critical situation, a predetermined determination condition in the first to sixth aspects is met. In the invention described in this aspect, since the risk detector automatically determines whether a vehicle is in a critical situation or not, it is desirable to provide a warning device for warning a driver when it is determined that risk exists.

According to the operational condition recording apparatus according to the seventh aspect, since the detailed recording of operational condition information is automatically started when the risk detector determines that a vehicle is in a critical situation, a record that a driver of the vehicle performed dangerous traveling is left independent of whether an accident occurs or not, the driver is educated for safe operation, the driver's own awareness of safe driving can be enhanced and as a result, the record can be useful to prevent a traffic accident.

An operational condition recording apparatus according to an eighth aspect is based upon the operational condition recording apparatus according to the seventh aspect and is characterized in that the risk detector detects that the corresponding vehicle is in a dynamic critical condition.

When a traveling vehicle conducts dangerous behavior which may cause a traffic accident, the operational condition recording apparatus according to the eighth aspect detects that the vehicle is in a dynamic critical condition. Concrete critical conditions are given as an example in the following ninth to seventeenth aspects.

That is, when the running speed of a vehicle is faster than legal speed by predetermined speed, an operational condition recording apparatus according to the ninth aspect detects that the vehicle is in a dynamic critical condition. When a driver of a vehicle suddenly treads a brake pedal, an operational condition recording apparatus according to the tenth aspect detects that the vehicle is in a dynamic critical condition. When ABS of a vehicle detects the locking of wheels, an operational condition recording apparatus according to the eleventh aspect detects the vehicle is in a dynamic critical condition. When distance between a vehicle and a front traveling vehicle is equal to or shorter than predetermined distance, an operational condition recording apparatus according to the twelfth aspect detects that the vehicle is in a dynamic critical condition, when a periphery monitoring device detects the access of a vehicle to another vehicle, an operational condition recording apparatus according to the thirteenth aspect detects that the vehicle is in a dynamic critical condition. And when the running speed of a vehicle is equal to predetermined speed or faster and a handle steering angle is equal to a predetermined angle or larger, an operational condition recording apparatus according to the fourteenth aspect detects that the vehicle is in a dynamic critical condition. These may cause an accident.

When the traveling condition of a vehicle may cause an accident, the operational condition recording apparatuses according to the ninth to fourteenth aspects detect that the vehicle is in a dynamic critical condition and the detailed recording of operational condition information can be started for the occurrence of an accident which may occur. Measures for safety such as warning a driver can be also taken based upon such detection.

An operational condition recording apparatus according to a fifteenth aspect is based upon the operational condition recording apparatus according to the eighth aspect and is characterized in that the dynamic critical condition of a vehicle is detected when difference in the rotational speed between right and left wheels calculated based upon the handle steering angle of the vehicle and difference in the actual rotational speed detected by a wheel rotational speed sensor between the right and left wheels are not coincident.

In case a vehicle travels along a sharp curve at speed exceeding safe speed, the operational condition recording apparatus according to the fifteenth aspect detects that any of the four wheels of the vehicle skids on the surface of a road and can judge that the vehicle is in a dynamic critical condition.

Further, an operational condition recording apparatus according to a sixteenth aspect is based upon the operational condition recording apparatus according to the eighth aspect and is characterized in that the dynamic critical condition of a vehicle is detected when difference is made between the rotational speed of the front wheel and the rotational speed of the rear wheel of the vehicle.

According to the operational condition recording apparatus according to the sixteenth aspect, particularly in case a vehicle travels on a frozen road and a snowy road, it is detected by detecting difference in the rotational speed between a driving wheel (the front wheel or the rear wheel) of the vehicle and a driven wheel (the rear wheel or the front wheel) that the vehicle skids on the surface of the road and it can be judged that the vehicle is in a dynamic critical condition.

In the meantime, an operational condition recording apparatus according to a seventeenth aspect is based upon the operational condition recording apparatus according to the eighth aspect and is characterized in that the dynamic critical condition of a vehicle is detected when a traveling position detector that detects relative positional relation between a lane of the road on which the vehicle travels and the vehicle detects the snaking and/or the deviation from the lane of the vehicle.

The operational condition recording apparatus according to the seventeenth aspect is mounted in a vehicle provided with the vehicular traveling position detector being recently progressed. In case the snaking and deviation from the lane of the road where the vehicle travels are detected by detecting a white line of the road by image processing and communication between the vehicle and a road, it is detected that the vehicle is in a dynamic critical condition. This detection is interlocked with the operational condition of blinkers and it is desirable that the operational condition recording apparatus is configured so that deviation into a right lane is not judged as a critical condition when the right blinker blinks.

As the operational condition recording apparatus according to the seventeenth aspect detects risk in case a vehicle snakes or deviates from the lane of the road where the vehicle travels because of dozing while driving and looking aside, measures for safety such as instructing an alarm near to a driver's seat to ring can be taken.

In the ninth to seventeenth aspects, the dynamic critical condition of a typical vehicle is described. However, naturally, in case a vehicle is put into a garage, it is inconvenient that the vehicle is judged to be in a critical condition because the driver powerfully turns a handle and suddenly treads a brake pedal.

Then, an operational condition recording apparatus according to an eighteenth aspect is based upon the operational condition recording apparatus according to any of the eighth to seventeenth aspects and is characterized in that the dynamic critical condition of a vehicle is detected only in case the running speed of the vehicle exceeds preset speed.

More concretely, as described in a nineteenth aspect, it is desirable that the preset speed of the operational condition recording apparatus according to the eighteenth aspect can be individually set every type of the critical condition.

In the eighth to nineteenth aspects, it is detected paying attention to the dynamic behavior of a vehicle that the vehicle is in a critical condition, however, a condition requiring more careful driving also exists depending upon a state of a road and weather even if a driver makes it his/her motto to safely drive.

Then, an operational condition recording apparatus according to a twentieth aspect is based upon the operational condition recording apparatus according to the seventh aspect and is characterized in that the risk detector detects that a vehicle travels in a dangerous region.

When a vehicle travels in a dangerous region which may cause an accident, the operational condition recording apparatus according to the twentieth aspect detects that the vehicle travels in the dangerous region. A concrete critical condition is described in twenty-first to twenty-ninth aspects described below as an example.

That is, in the twenty-first aspect, when a vehicle travels along a sharp curve, it is detected that the vehicle travels in a dangerous region. In the twenty-second aspect, when a vehicle travels on a road during construction, it is detected that the vehicle travels in a dangerous region. In the twenty-third aspect, when a vehicle travels on a road not open, it is detected that the vehicle travels in a dangerous region. In the twenty-fourth aspect, when a vehicle travels in an intersection not open, it is detected that the vehicle travels in a dangerous region. In the twenty-fifth aspect, when a vehicle travels on a road with a downward steep slope, it is detected that the vehicle travels in a dangerous region. In the twenty-sixth aspect, when a vehicle travels on a road where many accidents occurred, it is detected that the vehicle travels in a dangerous region. In the twenty-seventh aspect, when a vehicle travels on a road the surface of which is frozen, it is detected that the vehicle travels in a dangerous region. In the twenty-eighth aspect, when a vehicle travels on a road while snow falls, it is detected that the vehicle travels in a dangerous region. In the twenty-ninth aspect, when a vehicle travels on a road where dense fog is caused, it is detected that the vehicle travels in a dangerous region. In these traveling regions, attention is particularly required to be paid to safe driving.

According to the operational condition recording apparatuses according to the twenty-first to twenty-ninth aspects, when the current traveling position of a vehicle is in a dangerous region in which safe driving is particularly required, it is detected that the vehicle travels in the dangerous region and the detailed recording of operational condition information can be started against the occurrence of an accident which may occur. Measures for safety such as warning the driver may be also taken based upon such detection.

An operational condition recording apparatus according to a thirtieth aspect is based upon the operational condition recording apparatus according to any of the first to twenty-ninth aspects and is characterized in that when a collision detector of the vehicle detects collision of the vehicle, recording operation is finished immediately after the occurrence of the collision.

In the operational condition recording apparatus according to the thirtieth aspect, in case a vehicle actually causes an accident, recording operation is finished immediately after the occurrence of collision. For detecting the collision of the vehicle, a dedicated sensor such as an acceleration sensor may be also provided, however, in a vehicle in which an air bag is mounted, a well-known sensor used for activating the air bag may also function as the acceleration sensor.

According to the operational condition recording apparatus according to the thirtieth aspect, since the operational condition of the vehicle is not required to be recorded after an accident occurs, recording operation is finished, and the waste of memory resources and the deletion of required data can be prevented.

An operating control system utilizing an operational condition recording apparatus according to a thirty-first aspect is characterized in that the system is provided with the operational condition recording apparatus according to any of the first to thirtieth aspects, a vehicle is further provided with a communication device that communicates from the vehicle to an outside control center and when the risk detector determines that the vehicle is in a critical situation, the communication device is activated.

In the system according to the thirty-first aspect, the control center can know that the vehicle is in a critical situation. Therefore, the control center can call its driver to draw his/her attention, can instruct the driver to take a rest and can instruct the driver to change a traveling route, depending upon a case.

According to the system according to the thirty-first aspect, since the control center can know that a vehicle is in a critical situation, the control center can execute fine operating control by calling its driver to draw his/her attention, instructing the driver to take a rest and instructing the driver to change a traveling route depending upon a case. To consider a case that a traffic accident actually occurs and the communication device is activated for the first time after the occurrence of the accident is detected, time is wasted until a channel is established, as a result, notification is delayed and in the worst case, the operation of the operational condition recording apparatus maybe stopped before data can be sent to the control center. However, in the present invention, the control center can acquire information related to the operational condition of a vehicle by activating communication device by activating the communication device when the critical situation is detected also in the case of the accident.

An operating control system utilizing an operational condition recording apparatus according to a thirty-second aspect is based upon the operating control system utilizing the operational condition recording apparatus according to the thirty-first aspect and is characterized in that a vehicle is further provided with the collision detector and when the collision detector detects the collision of the vehicle, contents recorded by the operational condition recording apparatus are sent to the control center via the communication device.

In the operational condition recording apparatuses according to the first to twenty-ninth aspects, after a vehicle returns to a garage, the control center and others, the recorder detached from the vehicle is installed in a host computer of the control center and data related to the operational condition may be downloaded.

In the system according to the thirty-second aspect, since the contents of the operational condition stored in the recorder are sent to the control center via the communication device when the collision detector detects an accident caused by the collision of vehicles, vehicular operational condition recorded data is stored before the recorder is damaged such as it is burned down after the collision accident. In such an embodiment, a backup battery for enabling the operation of the operational condition recording apparatus and the communication device is provided and it is desirable that these devices are arranged in a location in the vehicle in which they are hardly damaged even if they are bumped in a traffic accident.

According to the system according to the thirty-second aspect, since the contents of the operational condition stored in the recorder are sent to the control center via the communication device when the collision detector detects the collision accident of a vehicle, the operational condition recorded data of the vehicle is sent to the control center before the recorder is damaged such as is burned down even if a traffic accident such as a collision accident is caused and can be stored in a computer of the control center.

An operating control system utilizing an operational condition recording apparatus according to a thirty-third aspect is based upon the operating control system utilizing the operational condition recording apparatus according to the thirty-second aspect and is characterized in that the above-mentioned sent contents at least include the current position of a vehicle.

In the system according to the thirty-third aspect, when a traffic accident such as a collision accident occurs, the current position of a vehicle is sent to the control center. When a collision accident occurs, a driver of the vehicle and a driver of a vehicle which is the other party of the collision may be injured, however, in this case, it is difficult for the driver himself/herself to promptly request a firehouse and the police for rescue. In addition, since a late-night transportation truck for example travels at night, it is also difficult to ask a general passer-by for help.

In the system according to the thirty-third aspect, since the current position of a vehicle is sent to the control center when a traffic accident such as a collision accident occurs, the control center immediately notifies the firehouse and the police and can request to rescue the driver. Generally, as the survival rate of a driver decreases as elapsed time from the occurrence of an accident to the rescue is extended, the system can greatly contribute to securing the safety of the driver's life if such prompt request for rescue is enabled. It is natural that a driver who regularly travels on a general road always accurately grasps the traveling position of his/her vehicle, however, on a highway, a driver himself/herself can often specify a location in which an accident occurred only to an extent that he/she caused an accident between OO interchange and XX interchange, and in such a case, sending the current position of the vehicle to the control center or notifying the control center of the current position of the vehicle enables possibly prompt rescue activity. From such a viewpoint, in a thirty-third aspect subordinate to the thirty-second aspect, when operational information is sent from a vehicle to the control center, the capability of correspondence to an accident can be enhanced by determining the order of priority so that the current position of the vehicle is first sent, then the operational information related to the latest dynamic behavior of the vehicle is sent and the general information of the operational situation of the vehicle is finally sent.

In the thirtieth aspect and the thirty-second aspect, a term of the detection of collision is used, however, collision with not only another vehicle and the structure of a road but a passer-by, a bicycle and an auto-bicycle is also included. Further, depending upon the character of a vehicle, particularly for a concrete mixer truck and a large-sized trailer, the overturning of the vehicle is also included in a concept of the detection of collision.

DESCRIPTION OF THE PREFERRED EMBODIMENT

Figure 1:
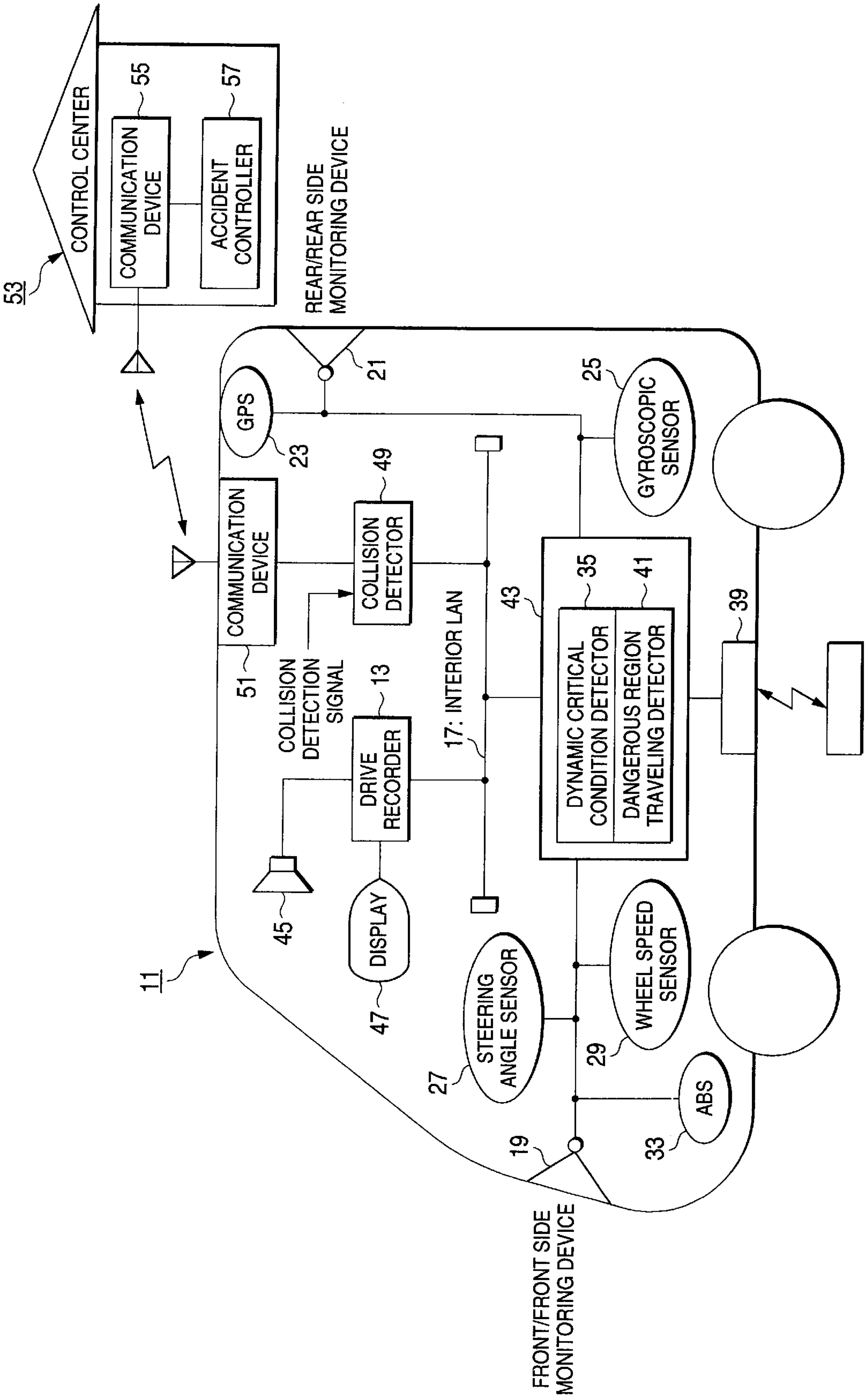
FIG. 1 is a schematic drawing showing an operational condition recording apparatus equivalent to an embodiment of the invention and an operating control system utilizing it.

Referring to the attached drawings, an embodiment of an operational condition recording apparatus according to the invention and an operating control system utilizing it will be described below. The same reference numeral is allocated to the same component in the description of the drawings and the description is omitted.

Figure 2:
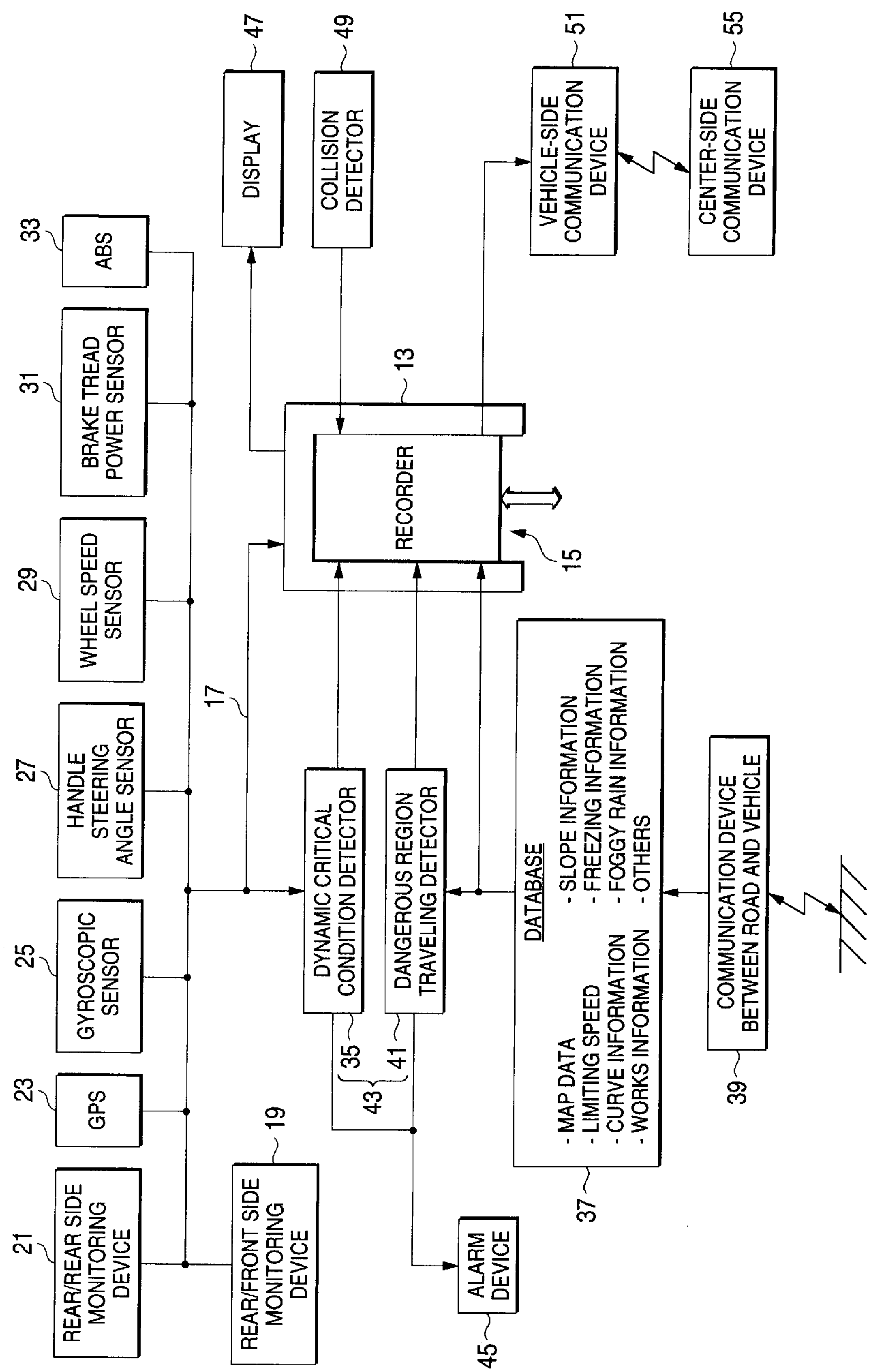
FIG. 2 is a block diagram showing the configuration of the operational condition recording apparatus equivalent to the embodiment shown in FIG. 1 and the operating control system utilizing it.

FIG. 1 is a schematic drawing showing the whole configuration of an operational condition recording apparatus and an operating control system utilizing it and FIG. 2 is a block diagram showing the configuration of such an operational condition recording apparatus.

As shown in the drawings, in the operational condition recording apparatus according to this embodiment, a drive recorder 13 is provided with normal functions as a digital tachograph and is mounted in a vehicle 11. A recorder 15 composed of a flash memory is detachably installed in the drive recorder 13.

Information from various sensors mounted in the vehicle 11 is input to the drive recorder 13 via interior LAN 17. That is, a front/front side monitoring device 19 comprising a radar arranged in the front of the vehicle 11, a rear/rear side monitoring device 21 comprising a radar arranged in the rear of the vehicle 11, a global positioning system (GPS) 23 for receiving an electric wave from a satellite for GPS to acquire the current position of the vehicle 11, a gyroscopic sensor 25 building a looped optical fiber inside for acquiring the information of the dynamic behavior such as the roll, the pitch and the yaw of the vehicle 11, a handle steering angle sensor 27 for acquiring the rotational condition of the handle, a wheel rotational speed sensor 29 respectively mounted on four wheels, a brake tread power sensor 31 mounted in the mechanical link system of a brake, and a source of an ABS signal 33 showing whether an anti-lock brake system (ABS) executes predetermined operation to prevent locking by suddenly treading the brake pedal or ABS is in a normal condition are connected via the interior LAN 17. The front/front side monitoring device 19 has a function for monitoring whether an obstacle exists in the front and the diagonal front (the front side) in the traveling direction of the vehicle or not and the rear/rear side monitoring device 21 has a function for monitoring whether an obstacle exists in the rear and the diagonal rear (the rear side) in the traveling direction of the vehicle or not. These front/front side monitoring device 19 and the rear/rear side monitoring device 21 may be generically called a periphery monitoring system.

Information from these various sensors is also input to a dynamic critical condition detector 35 which is a unit including CPU. The detector 35 always monitors the dynamic behavior of the vehicle 11 and determines that the vehicle 11 is in a dynamic critical condition when the behavior of the vehicle 11 meets a predetermined condition. When the dynamic critical condition detector 35 determines that the vehicle is in the dynamic critical condition, a signal showing it is transmitted to the drive recorder 13.

A database 37 is installed in the vehicle 11 and includes the map data which is similar to that of a well-known car navigation system, limiting speed data of each road, data representing the curvature of a curve of each road, data representing the locations where construction is held, data of the incline of each road, data of a frozen condition of a road surface, and data representing a region in which heavy rain, snowfall or dense fog is caused. These data are always updated based upon information provided from road facilities via a road-vehicle communication device 39.

Information stored in the database 37 is input to a dangerous area traveling detector 41 which is a unit including CPU. The detector 41 always compares the current position of the vehicle 11 with the information of the database 37 and determines that the vehicle 11 is in a dangerous area traveling condition when the vehicle 11 travels in a predetermined area. When the dangerous area traveling detector 41 determines that the vehicle travels in a dangerous area, a signal representing it is transmitted to the drive recorder 13.

A risk detector 43 for determining that the vehicle 11 is in a dangerous situation comprises the dynamic critical condition detector 35 and the dangerous area traveling detector 41. When the risk detector 43 determines that the vehicle 11 is in a dangerous situation, the signal is transmitted to the drive recorder 13 as described above while a warning device

45 arranged near to a driver's seat is operated to attract the attention of a driver.

A display 47 both used as a display of a car navigation system is connected to the drive recorder 13 and the contents being currently recorded of the drive recorder 13 can be displayed according to a request from the driver.

Information from a collision detector 49 both used as a collision detector for air bags (not shown) of the vehicle 11 is input to the drive recorder 13. The collision detector can detect the occurrence of a collision accident when the vehicle 11 collides with forward another vehicle or collides with structure around a road such as a pole.

Further, in the operating control system utilizing the operational condition recording apparatus configured as described above, a vehicle side communication device 51 on the vehicle 11 is connected to the drive recorder 13 so that information such as the operational condition can be transmitted to an outside control center 53 from the vehicle 11. A center side communication device 55 on the control center 55 for receiving transmission from the vehicle side communication device 51 on the vehicle 11 and an accident controller 57 comprising a host computer are installed in the control center 53.

Next, the operation of the operational condition recording apparatus configured as described above and the operating control system utilizing it according to this embodiment will be described.

Suppose that the vehicle 11 which is a transportation truck is located at a cargo terminal which also functions as the control center 53. The driver presses a button of "loading" of a control switch (not shown) of the drive recorder 13 and notifies that the vehicle 11 is currently engaged in loading. Hereby, the information of loading is recorded together with the current time in the recorder 15 of the drive recorder 13. When loading is completed, the driver presses a button of "traveling with a cargo". Then, the drive recorder 13 starts recording in a first recording mode described in the first aspect. Specifically, the drive recorder 13 records the running speed detected by a wheel rotational speed sensor corresponding to the current time. A recording cycle at this time is a low sampling interval such as once per 0.5 second. In another embodiment, the drive recorder may record the current coordinates sent from GPS 23 together with the running speed.

In case the vehicle 11 is a long-distance transportation truck, information that the driver is during a break is recorded in the recorder 15 of the drive recorder 13 by pressing a button of "break" when the driver takes the break halfway. Similarly, the driver can record the current operational condition of the vehicle 11 in the drive recorder 13 by pressing a button such as "inspection", "refueling" and "loading". When the vehicle 11 arrives at a destination of transportation, the driver presses a button of "unloading" to record that the vehicle is stopped because of unloading. When unloading is completed, the driver returns to the cargo terminal after he/she presses a button of "traveling without cargo".

When the vehicle 11 returns to the cargo terminal, the driver extracts the recorder 15 from the drive recorder 13 and inserts it into a reader (not shown) of a host computer of the control center. Then, the whole history from the departure to the arrival of the vehicle 11 is read in the host computer, the reader erases the contents of the recorder 15 and the recorder 15 waits for the next use. A person in charge of operating control can manage how the vehicle 11 travels on the screen of a terminal of the host computer.

As described above, the operational condition recording apparatus according to this embodiment executes the similar operation to a normal digital tachograph and also achieves the similar object.

Next, a case that the vehicle 11 meets with a dangerous situation during traveling will be described. For example, when the running speed of the vehicle 11 is faster by predetermined speed than legal speed, when it is detected by the brake tread power sensor 31 that the driver suddenly treads a brake pedal, when ABS 33 of the vehicle 11 detects the locking of wheels, when it is detected by the front/front side monitoring device 19 that distance between the vehicle and a front traveling vehicle is shorter than predetermined distance, when the rear/rear side monitoring device 21 detects abnormal access to the succeeding traveling another vehicle, or when the handle steering angle sensor 27 detects sudden handle steering during high speed traveling, the dynamic critical condition detector 35 detects that the vehicle 11 is in a dynamic critical condition. These cases may cause an accident.

Then, the dynamic critical condition detector 35 sends a control signal to the warning device 45. A warning such as "Exceeds legal speed", "a vehicle approaches on the rear-side" and "Distance with another vehicle is short" is emitted from a speaker at the driver's seat according to a type of the critical condition.

Simultaneously, the dynamic critical condition detector 35 sends a predetermined switching signal to the drive recorder 13 and the recording mode of the drive recorder 13 is automatically switched to the second recording mode when the drive recorder 13 receives the signal. The drive recorder 13 switched to the second recording mode starts to record information from the various sensors 19 to 33 in the recorder 15 at a high density sampling interval such as every 0.1 second. Simultaneously, the drive recorder operates the vehicle side communication device 51 and establishes a channel between the vehicle and the control center 53.

When the driver suitably avoids the critical situation, the dynamic critical condition detector 35 stops the warning and sends a predetermined restoration signal to the drive recorder 13, then the recording mode of the drive recorder 13 that receives the signal is restored to the first recording mode. The drive recorder 13 sends data recorded in the second recording mode to the control center 53 via the communication device on the side of the vehicle 51. This data is received by the communication device on the side 55 of the control center 53 and is stored in a recording device of the accident controller 57 which is a host computer. When the drive recorder 13 completes the sending of data recorded in the second recording mode, the corresponding data is deleted from the recorder 15 to secure the free capacity of the memory.

Next, a case that the vehicle 11 travels in a region of a road in which safe driving is required to be particularly performed will be described. For example, when the vehicle 11 travels along a sharp curve, when it travels on a road during the construction, when it travels on a road not open or in an intersection not open, when it travels on a road with a downward steep slope, when it travels on a road on which many accidents have occurred, when it travels on a road the surface of which is frozen, when it travels on a road while snow falls, or when it travels on a road on which dense fog is caused, the dangerous region traveling detector 41 detects that the vehicle 11 is traveling in a dangerous region because these are regions where safe driving is particularly required.

Then, the dangerous region traveling detector 41 sends a control signal to the warning device 45 so that a warning such as "Here many accidents occurred", "There is a sharp curve forward" and "The surface of a road is frozen" is emitted from a speaker at the driver's seat according to a type of a critical condition.

Simultaneously, the dangerous region traveling detector 41 sends a predetermined switching signal to the drive recorder 13 and the recording mode of the drive recorder 13 which receives the signal is automatically switched to the second recording mode. The drive recorder 13 the recording mode of which is switched to the second recording mode starts to record information from various sensors 19 to 33 in the recorder 15 at a high density sampling interval such as every 0.1 second. Simultaneously, the drive recorder operates the communication device on the side of the vehicle 51 so that a channel between the vehicle and the control center 53 is established.

When the driver suitably avoids a critical situation, the dangerous region traveling detector 41 stops the warning and sends a predetermined restoration signal to the drive recorder 13, then the recording mode of the drive recorder 13 which receives it is restored to the first recording mode. The drive recorder 13 sends data recorded in the second recording mode to the control center 53 via the communication device on the side of the vehicle 51. This data is received by the communication device on the side 55 of the control center 53 and is stored in the recording device of the accident controller 57 which is a host computer. When the drive recorder 13 completes the sending of the data recorded in the second recording mode, the corresponding data is deleted from the recorder 15 to secure the free capacity of the memory.

As described above, in case the driver safely avoids a critical situation, finishes predetermined transportation work and returns to the cargo center, a frightened situation which is experienced by the driver during traveling and which may cause an accident is analyzed in a safety management room of the control center. Data recorded in the second recording mode is re-created in detail by computer graphics on the screen of the terminal of the host computer. Hereby, a concrete cause of danger such as the speed of an opposite vehicle is measured with the eye by mistake when the vehicle turns to the right in an intersection, the steering of a handle when the vehicle changes a lane to a passing lane is too sharp and the vehicle changes the lane to the passing lane without sufficiently seeing through the running speed of the succeeding vehicle can be specified. Such a lesson is not only useful to enhance the safe driving ability of the driver himself but is useful for the safe education of other drivers by adopting suitable cases and holding a regular educational training meeting.

Next, a case that the vehicle 11 should cause a traffic accident will be described. Collision with another vehicle, the structure of a road, a passer-by and others is detected by the collision detector 49. Generally, various operation including the switching of the recording mode of the drive recorder 13 is executed before actual collision by the risk detector 43 comprising the dynamic critical condition detector 35 and the dangerous region traveling detector 41.

When the control center 53 receives communication from the vehicle side communication device 51, the control center 53 instructs the terminal of the accident controller 57 to display a warning and instructs an alarm to be rung. The person in charge of control who knows the warning or the instruction calls the driver by radio communication etc., asks for the explanation of a situation and calls the driver's attention. However, if such correspondence is too late and the vehicle 11 collided with a front traveling vehicle, the occurrence of the collision is detected by the collision detector 49 and its signal is sent to the drive recorder 13. The drive recorder 13 which receives the signal controls the vehicle side communication device 51 and sends the current coordinates of the vehicle to the control center 53 together with a signal showing the occurrence of the accident. Though the drive recorder 13 records in the second recording mode immediately before the collision, recording operation is finished immediately after the collision (for example, in one second). Data recorded in the second recording mode before and after the accident is first sent via the communication device on the side of the vehicle 51 and when the sending of the data is safely completed, the contents of the recorder 15 are all sent.

The control center 53 calls the driver by radio communication and inquires about a situation of the accident. Unless the driver is injured, the control center instructs correspondence according to the situation of the accident. When the driver loses consciousness, does not respond or responds that he is injured, the person in charge of control immediately notifies the police and a fire station for an ambulance of the occurrence of the accident and tells the positional coordinates of the scene of the accident. In this embodiment, as described above, when the risk detector 43 senses risk, a channel between the vehicle 11 and the control center 53 is established and in addition, when the collision detector 49 detects a collision, the drive recorder 13 controls the vehicle side communication device 51 and sends the current coordinates of the vehicle to the control center 53 together with a signal showing the occurrence of the accident in first order of priority. Therefore, in a large scale traffic accident, the coordinates where the accident occurs of the vehicle 11 can be also at least acquired. Further, when the vehicle is involved in a significant traffic accident and the operational condition recording apparatus is completely broken at the instant of the accident, since the data, which is recorded in the second recording mode to be sent after the driver avoids risk after a channel between the control center and the communication device on the vehicle 51 is establish, is stopped, the control center 53 can immediately grasp that a serious situation occurs hereby.

The above-mentioned embodiment is an example for facilitating the understanding of the invention and does not limit the technical scope of the invention. That is, the invention naturally includes all embodiments in the technical scope and also includes any equivalent.

As described above, according to the operational condition recording apparatus according to the invention and the operating control system utilizing it, the following effect is acquired.

The operational condition recording apparatus according to the first aspect can record in detail a condition of a vehicle before and after an accident occurs, while having the similar function to that of a related tachograph. Therefore, after the accident occurs, a situation in which the accident occurs can be re-create in detail, the cause of the accident can be analyzed based upon such re-created data and the recurrence of an accident can be also prevented.

According to the operational condition recording apparatus according to the second aspect, as the operational condition information of a vehicle is recorded at a short sampling interval when a recording mode is switched to the second recording mode, high density information can be recorded, a condition of the vehicle before and after an accident occurs can be recorded in detail and a situation in which the accident occurs can be re-created in detail after the accident occurs. Since operational condition information is recorded at a sampling period required and sufficient for a tachograph in the first recording mode, the recorder having large capacity is not required.

According to the operational condition recording apparatus according to the third aspect, since vehicular operational condition information of a type which is not recorded in the first recording mode is recorded in the second recording mode, not only a condition of own vehicle before and after an accident occurs but relation with another vehicle traveling around and the structure of a road can be recorded in detail and a situation in which the accident occurs can be further re-created in detail.

In the description of the first to third aspects, the occurrence of a traffic accident is mainly described, however, in case a vehicle slips or spins though it does not cause an accident, a situation in which such a critical condition occurs can be recorded and re-created.

According to the operational condition recording apparatus according to the fourth aspect, since a recording mode is restored from the second recording mode to the first recording mode when a situation changes from a state in which a predetermined determination condition is met to a state of failure, the operation is restored to the similar operation to that of a normal operational condition recording apparatus after a vehicle escapes from the critical condition, the drive recorder is released from a large quantity of information record required in the second recording mode, the resources of the recorder are never consumed in vain and the memory capacity required by the recorder can be reduced possibly.

Though the operational condition recording apparatus according to the fifth aspect is not suitable for managing the whole operational history of a vehicle such as a truck and a taxi, a lesson of being frightened is effectively utilized by recording the operational condition information of a vehicle when the vehicle meets with a critical situation in a field without needs to mount an operational condition recording apparatus such as a private car owned by an individual. Learning data for preventing the occurrence of a future accident beforehand can be provided and a hint for safe driving can be given particularly to a newly-licensed driver and a driver only driving on the weekend. This operational condition recording apparatus can be applied not only to a private car but also to a training car of a driving school. After training on a road is finished in the driving school, concrete data is presented to a trainee to be the material of training for safe driving. If a predetermined determination condition is set according to that an instructor puts his foot on a brake pedal on the side of a spare seat on which the instructor is seated in a training vehicle of a driving school or the instructor operates a predetermined switch, the configuration of the operational condition recording apparatus can be facilitated.

According to the operational condition recording apparatus according to the sixth aspect, since recording operation is stopped when a situation changes from a state in which a predetermined determination condition is met to a state of failure, only a situation before and after a vehicle is in a critical condition can be recorded in the recorder. Therefore, the required memory capacity of the recorder can be reduced possibly. In consideration of the object of providing the material of a lesson for safe driving, unnecessary information is not recorded differently from a general tachograph and as only information useful for preventing a future traffic accident is recorded, the operational condition recording apparatus is convenient for the object.

In the operational condition recording apparatuses according to the first to sixth aspects, various elements can be adopted as a predetermined determination condition as described above. As various sensors are mounted in a recent automobile, it is convenient if these are effectively utilized and can be useful to judge whether a predetermined determination condition is met or not.

According to the operational condition recording apparatus according to the seventh aspect, since the detailed recording of operational condition information is automatically started when a risk detector determines that a vehicle is in a critical situation, a record that a driver of the vehicle performed dangerous traveling is left independent of whether an accident occurs or not, the driver is educated for safe operation, the driver's own awareness of safe driving can be enhanced and as a result, the record can be useful to prevent a traffic accident.

When the traveling condition of a vehicle may cause an accident, the operational condition recording apparatuses according to the ninth to fourteenth aspects detect that the vehicle is in a dynamic critical condition and the detailed recording of operational condition information can be started against the occurrence of an accident. Measures for safety such as warning a driver can be also taken based upon such detection.

Particularly in case a vehicle travels along a sharp curve at speed exceeding safe speed, the operational condition recording apparatus according to the fifteenth aspect detects that any of the four wheels of the vehicle slips on the surface of a road and can judge that the vehicle is in a dynamic critical condition.

According to the operational condition recording apparatus according to the sixteenth aspect, particularly in case a vehicle travels on a frozen road and a snowy road, it is detected by detecting difference in the rotational speed between a driving wheel (the front wheel or the rear wheel) of the vehicle and a driven wheel (the rear wheel or the front wheel) that the vehicle slips on the surface of the road and it can be judged that the vehicle is in a dynamic critical condition.

Since the operational condition recording apparatus according to the seventeenth aspect detects risk in case a vehicle snakes or deviates from a lane of the road where the vehicle travels because of dozing and looking aside while driving, measures for safety such as instructing an alarm near to a driver's seat to ring can be taken.

According to the operational condition recording apparatuses according to the eighteenth and nineteenth aspects, in case a vehicle is put into a garage, the vehicle is not judged to be in a critical condition even if the driver powerfully turns a handle, suddenly treads a brake pedal and distance between vehicles is short, and only a really critical situation can be discriminated.

In the eighth to nineteenth aspects, it is detected paying attention to the dynamic behavior of a vehicle that the vehicle is in a critical condition, however, a condition requiring more careful driving also exists depending upon a state of a road and weather even if a driver makes it his/her motto to safely drive.

According to the operational condition recording apparatuses according to the twenty-first to twenty-ninth aspects, when the current traveling position of a vehicle is in a dangerous region in which safe driving is particularly required, it is detected that the vehicle travels in the dangerous region and the detailed recording of operational condition information can be started against the occurrence of an accident. Measures for safety such as warning the driver may be also taken based upon such detection.

According to the operational condition recording apparatus according to the thirtieth aspect, since the operational condition of a vehicle is not required to be recorded after an accident occurs, recording operation is finished, and the waste of memory resources and the deletion of required data can be prevented.

According to the system according to the thirty-first aspect, since the control center can know that a vehicle is in a critical situation, the control center can execute fine operating control by calling its driver to draw his/her attention, instructing the driver to take a rest and instructing the driver to change a traveling route depending upon a case. To consider a case that a traffic accident actually occurs, in case communication device is activated after the occurrence of the accident is detected, time is wasted until a channel is established, as a result, notification is delayed and in the worst case, the operation of the operational condition recording apparatus may be stopped before data can be sent to the control center. However, the control center can acquire information related to the operational condition of a vehicle in the case of the accident by activating communication device when the critical situation is detected.

For the operational condition recording apparatuses according to the first to twenty-ninth aspects, after a vehicle returns to a garage, the control center and others, the recorder detached from the vehicle is installed in a host computer of the control center and data related to the operational condition is extracted.

According to the system according to the thirty-second aspect, since the contents of the operational condition stored in the recorder are sent to the control center via the communication device when the collision detector detects the collision accident of a vehicle, the operational condition recorded data of the vehicle is sent to the control center before the recorder is damaged such as is burned down even if a traffic accident such as a collision accident is caused, therefore, the operational condition can be stored in a computer of the control center.

The system according to the thirty-third aspect produces extremely excellent effect that the capability of correspondence to an accident can be enhanced by first sending the current position of a vehicle, then sending the operational information related to the latest dynamic behavior of the vehicle and finally determining the order of priority so that the general information of a vehicular operational situation is sent when the operational information is sent from the vehicle to the control center.

What is claimed is:

1. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met, wherein the predetermined determination condition is met when a risk detector determines that the vehicle is in a critical situation, wherein the risk detector detects that the vehicle travels in a dangerous region.

2. The operational condition recording apparatus according to claim 1, wherein:

in the second mode, the vehicular operational condition information is recorded at a shorter sampling interval compared with that in the first mode.

3. The operational condition recording apparatus according to claim 1, wherein:

in the second recording mode, the vehicular operational condition information of a type which is not recorded in the first recording mode is recorded.

4. The operational condition recording apparatus according to claim 1, wherein:

when a situation changes from a state in which the predetermined determination condition is met to a state of failure, the recording mode is restored from the second mode to the first mode.

5. The operational condition recording apparatus according to claim 1, wherein the predetermined determination condition is met when a risk detector determined that the vehicle is in a critical situation.

6. The operational condition recording apparatus according to claim 5, wherein the risk detector detects that the vehicle is in a dynamic critical condition.

7. The operational condition recording apparatus according to claim 6, wherein the dynamic critical condition is detected when a driver of the vehicle suddenly treads a brake pedal.

8. The operational condition recording apparatus according to claim 6, wherein the dynamic critical condition of the vehicle is detected when ABS detects a locking of the wheels.

9. The operational condition recording apparatus according to claim 6, wherein the dynamic critical condition is detected when a periphery monitoring device detects access to another vehicle.

10. The operational condition recording apparatus according to claim 6, wherein the dynamic critical condition is detected when the running speed exceeds predetermined speed and a handle steering angle exceeds a predetermined angle.

11. The operational condition recording apparatus according to claim 1, wherein the vehicle traveling in the dangerous region is detected when the vehicle travels along a sharp curve.

12. The operational condition recording apparatus according to claim 1, wherein the vehicle traveling in the dangerous region is detected when the vehicle travels on a road during construction.

13. The operational condition recording apparatus according to claim 1, wherein the vehicle traveling in the dangerous region is detected when the vehicle travels on a road not open.

14. The operational condition recording apparatus according to claim 1, wherein the vehicle traveling in the dangerous region is detected when the vehicle travels in an intersection not open.

15. The operational condition recording apparatus according to claim 1, wherein the vehicle traveling in the dangerous region is detected when the vehicle travels on a road with a downward steep slope.

16. The operational condition recording apparatus according to claim 1, wherein the vehicle traveling in the dangerous region is detected when the vehicle travels on a road where many accidents occurred.

17. The operational condition recording apparatus according to claim 1, wherein the vehicle traveling in the dangerous region is detected when the vehicle travels on a road the surface of which is frozen.

18. The operational condition recording apparatus according to claim 1, wherein the vehicle traveling in the dangerous region is detected when the vehicle travels on a road while snow falls.

19. The operational condition recording apparatus according to claim 1, wherein the vehicle traveling in the dangerous region is detected when the vehicle travels on a road on which dense fog is caused.

20. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met, wherein the predetermined determination condition is met when a risk detector determines that the vehicle is in a critical situation, wherein the risk detector detects that the vehicle is in a dynamic critical condition, wherein the dynamic critical condition is detected when the running speed is faster than legal speed by a predetermined speed.

21. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met, wherein the predetermined determination condition is met when a risk detector determines that the vehicle is in a critical situation, wherein the risk detector detects that the vehicle is in a dynamic critical condition, wherein the dynamic critical condition is detected when distance between the vehicle and a front traveling vehicle is a predetermined distance or less.

22. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met, wherein the predetermined determination condition is met when a risk detector determines that the vehicle is in a critical situation, wherein the risk detector detects that the vehicle is in a dynamic critical condition, wherein the dynamic critical condition is detected when a difference in the rotational speed between right and left wheels calculated based upon the handle steering angle and a difference in the actual rotational speed detected by a wheel rotational speed sensor between the right and left wheels are not coincident.

23. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met, wherein the predetermined determination condition is met when a risk detector determines that the vehicle is in a critical situation, wherein the risk detector detects that the vehicle is in a dynamic critical condition, wherein the dynamic critical condition is detected when a difference is made between the rotational speed of a front wheel and the rotational speed of a rear wheel of the vehicle.

24. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met, wherein the predetermined determination condition is met when a risk detector determines that the vehicle is in a critical situation, wherein the risk detector detects that the vehicle is in a dynamic critical condition, wherein the dynamic critical condition is detected when a traveling position detector which detects relative positional relation between a lane of a road on which the vehicle travels and the vehicle detects snaking or deviation from the lane of the vehicle.

25. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met, wherein the predetermined determination condition is met when a risk detector determines that the vehicle is in a critical situation, wherein the risk detector detects that the vehicle is in a dynamic critical condition, wherein the dynamic critical condition is detected only in case the running speed exceeds a preset speed.

26. The operational condition recording apparatus according to claim 25, wherein the preset speed can be individually set every type of the critical condition.

27. An operational condition recording apparatus which can record vehicular operational condition information of a vehicle including at least one of running speed rotational speed of wheels, engine revolving speed, position of a shift, handle steering angle, brake tread power, operational condition of ABS, result of peripheral monitoring and distance between another vehicle, the operational condition recording apparatus comprising:

a first mode as a recording mode in which the operational condition recording apparatus always records the vehicular operational condition information; and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met, wherein recording of the vehicular operation condition information is finished immediately after a collision detector of the vehicle detects the collision of the vehicle.

28. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein when a situation changes from a state in which the predetermined determination condition is met to a state of failure, the recording operation is stopped.

29. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein the predetermined determination condition is met when a risk detector determines that the vehicle is in a critical situation, wherein the risk detector detects that the vehicle is in a dynamic critical condition, wherein the dynamic critical condition is detected when the running speed is faster than a legal speed by a predetermined speed.

30. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein the predetermined determination condition is met when a risk detector determines that the vehicle is in a critical situation, wherein the risk detector detects that the vehicle travels in a dangerous region.

31. The operational condition recording apparatus according to claim 30, wherein the predetermined determination condition is met when a risk detector determines that the vehicle is in a critical situation.

32. The operational condition recording apparatus according to claim 31, wherein the risk detector detects that the vehicle is in a dynamic critical condition.

33. The operational condition recording apparatus according to claim 32, wherein the dynamic critical condition is detected when a driver of the vehicle suddenly treads a brake pedal.

34. The operational condition recording apparatus according to claim 32, wherein the dynamic critical condition of the vehicle is detected when ABS detects a locking of the wheels.

35. The operational condition recording apparatus according to claim 32, wherein the dynamic critical condition is detected when a periphery monitoring device detects access to another vehicle.

36. The operational condition recording apparatus according to claim 32, wherein the dynamic critical condition is detected when the running speed exceeds predetermined speed and a handle steering angle exceeds a predetermined angle.

37. The operational condition recording apparatus according to claim 30, wherein the vehicle traveling in the dangerous region is detected when the vehicle travels along a sharp curve.

38. The operational condition recording apparatus according to claim 30, wherein the vehicle traveling in the dangerous region is detected when the vehicle travels on a road during construction.

39. The operational condition recording apparatus according to claim 30, wherein the vehicle traveling in the dangerous region is detected when the vehicle travels on a road not open.

40. The operational condition recording apparatus according to claim 30, wherein the vehicle traveling in the dangerous region is detected when the vehicle travels in an intersection not open.

41. The operational condition recording apparatus according to claim 30, wherein the vehicle traveling in the dangerous region is detected when the vehicle travels on a road with a downward steep slope.

42. The operational condition recording apparatus according to claim 30, wherein the vehicle traveling in the dangerous region is detected when the vehicle travels on a road where many accidents occurred.

43. The operational condition recording apparatus according to claim 30, wherein the vehicle traveling in the dangerous region is detected when the vehicle travels on a road the surface of which is frozen.

44. The operational condition recording apparatus according to claim 30, wherein the vehicle traveling in the dangerous region is detected when the vehicle travels on a road while snow falls.

45. The operational condition recording apparatus according to claim 30, wherein the vehicle traveling in the dangerous region is detected when the vehicle travels on a road on which dense fog is caused.

46. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein the predetermined determination condition is met when a risk detector determines that the vehicle is in a critical situation, wherein the risk detector detects that the vehicle is in a dynamic critical condition, wherein the dynamic critical condition is detected when a distance between the vehicle and a front traveling vehicle is a predetermined distance or less.

47. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein the predetermined determination condition is met when a risk detector determines that the vehicle is in a critical situation, wherein the risk detector detects that the vehicle is in a dynamic critical condition, wherein the dynamic critical condition is detected when a difference in the rotational speed between right and left wheels calculated based upon the handle steering angle and a difference in the actual rotational speed detected by a wheel rotational speed sensor between the right and left wheels are not coincident.

48. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein the predetermined determination condition is met when a risk detector determines that the vehicle is in a critical situation, wherein the risk detector detects that the vehicle is in a dynamic critical condition, wherein the dynamic critical condition is detected when a difference is made between the rotational speed of a front wheel and the rotational speed of a rear wheel of the vehicle.

49. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein the predetermined determination condition is met when a risk detector determines that the vehicle is in a critical situation, wherein the risk detector detects that the vehicle is in a dynamic critical condition, wherein the dynamic critical condition is detected when a traveling position detector which detects a relative positional relation between a lane of a road on which the vehicle travels and the vehicle detects at least one of the snaking of the vehicle and the deviation from the lane.

50. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein the predetermined determination condition is met when a risk detector determines that the vehicle is in a critical situation, wherein the risk detector detects that the vehicle is in a dynamic critical condition, wherein the dynamic critical condition is detected only in case the running speed exceeds a present speed.

51. The operational condition recording apparatus according to claim 50, wherein the preset speed can be individually set every type of the critical condition.

52. An operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein:

when a predetermined determination condition is met, a recording operation of the vehicular operational condition information is started, wherein recording of the vehicular operation condition information is finished immediately after a collision detector of the vehicle detects the collision of the vehicle.

53. An operating control system utilizing an operational condition recording apparatus, comprising:

the operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, wherein a recording operation of the operational condition information is started when a predetermined determination condition is met; and a communication device for communicating from the vehicle to an outside control center provided in the vehicle, a risk detector, wherein the communication device is activated when the risk detector determines that the vehicle is in a critical situation, and wherein the risk detector detects that the vehicle travels in a dangerous region.

54. The operating control system according to claim 53, wherein the vehicle is provided with collision detector, when the collision detector detects a collision of the vehicle, contents recorded by the operational condition recording apparatus are sent to the control center via the communication device.

55. An operating control system utilizing an operational condition recording apparatus, comprising:

the operational condition recording apparatus which can record vehicular operational condition information of a vehicle including at least one of running speed, rotational speed of wheels, engine revolving speed, position of a shift, handle steering angle, brake tread power, operational condition of ABS, result of peripheral monitoring and distance between another vehicle, the operational condition recording apparatus including, a first mode as a recording mode in which the operational condition recording apparatus always records the vehicular operational condition information, and a second mode as the recording mode in which the operation condition recording apparatus records the vehicular operational condition information in more detail compared with that in the first mode, the first and second mode can be switched, wherein the recording mode is switched from the first mode to the second mode when a predetermined determination condition is met; and a communication device for communicating from the vehicle to an outside control center provided in the vehicle;

a risk detector, wherein the communication device is activated when the risk detector determines that the vehicle is in a critical situation, and wherein the risk detector detects that the vehicle travels in a dangerous region.

56. The operating control system according to claim 55, wherein the vehicle is provided with a collision detector, when the collision detector detects a collision of the vehicle, contents recorded by the operational condition recording apparatus are sent to the control center via the communication device.

57. The operating control system according to claim 56, wherein the sent contents include at least the current position of the vehicle.

58. The operating control system according to claim 56, wherein the sent contents include at least the current position of the vehicle.

* * * * *